United States Patent Office 3,770,781
Patented Nov. 6, 1973

3,770,781
METHOD OF PRODUCING HYDROXYAMIDES
AND REACTION PRODUCTS THEREOF
Louis Deane Rollmann and Sundaresa Srinivasan, Princeton, N.J., assignors to Mobil Oil Corporation
No Drawing. Filed Apr. 30, 1971, Ser. No. 139,186
Int. Cl. C07c *103/16, 103/38;* C08g *17/02*
U.S. Cl. 260—404                                9 Claims

ABSTRACT OF THE DISCLOSURE

Beta-hydroxyamides are produced by the steps of (1) reacting a ketene and an aldehyde and (2) reacting the resulting intermediate reaction mixture with an amine. The intermediate reaction product contains a lactone and a polymeric material both of which react with the amine to form the corresponding beta-hydroxyamide. A portion of the final reaction product may consist of said polymer. The amide product alone or the reaction mixture containing amide and unreacted polymer is useful as a biodegradable nonionic detergent.

BACKGROUND OF THE INVENTION

Field of the invention

This invention relates to the method of making hydroxyamides and to reaction products obtained therefrom; and in particular, it relates to a method of making beta-hydroxyamides.

Description of the prior art

In a copending U.S. application, Ser. No. 100,543, filed on Dec. 21, 1970, there are disclosed detergent compositions, including amides of hydroxyalkanoic acids. These are produced by reacting a lactone with an amine. There is no disclosure, however, of reacting amine with products of ketene-aldehyde reactions.

It is also known that beta-propiolactone can be obtained from reacting ketene and formaldehyde. This is a condensation reaction and is usually produced only on a technical scale (Advanced Organic Chemistry, Fieser and Fieser, Reinhold, New York, 1961, p. 573). Moreover, beta-lactones can form a polyester in the presence of mineral acid. As in the first reference, this reference does not disclose the reaction between an amine and reaction product of a ketene and an aldehyde.

SUMMARY OF THE INVENTION

It has now been discovered that beta-hydroxyamides may be obtained in excellent yield by reacting an amine with the reaction product of a ketene and an aldehyde. Moreover, the final reaction mixture containing the amide has also been found useful as a detergent composition.

DESCRIPTION OF SPECIFIC EMBODIMENTS

The first step of the process of this invention consists of reacting an aldehyde and ketene to produce an intermediate reaction mixture containing a lactone and a polymerized ester. It has been found that the amount of polymer present in the mixture is greater than that of the lactone. The reaction is understood to proceed as follows:

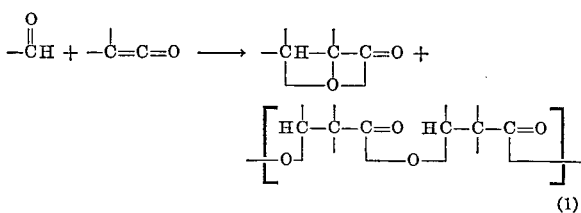

(1)

This reaction can be carried out at temperatures ranging from below room temperature (or about 5° to 10° C.) to about 100° C., preferably in the presence of a Lewis acid catalyst, such as zinc chloride.

The aldehyde used in this invention has the formula R—CHO, wherein R may be hydrocarbyl, such as alkyl, aryl, aralkyl or alkaryl having from 1 to about 50 carbon atoms, and preferably from 4 to about 20. Such aldehydes as acetaldehyde, propionaldehyde, butyraldehyde, benzaldehyde and the like are suitable for use in this invention. Most preferred are hexanal, octanal, decanal, undecanal, dodecanal, tridecanal, tetradecanal, hexadecanal, octadecanal, eicosanal and the like.

The ketenes used in this invention have the formula

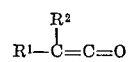

wherein $R^1$ and $R^2$ may each be hydrogen or hydrocarbyl, including alkyl, aryl, aralkyl, alkaryl, having from 1 to about 30 carbon atoms, and preferably either one or both $R^1$ and $R^2$ are hydrogen or alkyl of from 1 to about 6 carbon atoms. The resulting lactone from reaction (1) would therefore have the structure

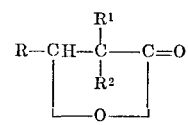

Ketenes may be produced by the pyrolysis of ketones or the cracking of carboxylic acids or by other known techniques. Their preparation is not part of this invention.

The reaction mixture from reaction (1) is reacted with an amine having the formula

wherein $R^3$ and $R^4$ may each be hydrogen, hydrocarbyl or hydroxy-hydrocarbyl such as alkyl, aryl, alkaryl, aralkyl and hydroxyalkyl. When $R^3$ or $R^4$ is organic, they may contain from 1 to about 30 carbon atoms, and preferably 4 to 20. When either one of $R^3$ and $R^4$ is hydrogen, the other is preferably an organic group, although ammonia can be used in the process of this invention. Such amines as ethylamine, propylamine, butylamine, hexylamine, decylamine, dodecylamnie, tetradecylamine, eicosamine, diethylamine, dibutylamine, dioctylamine, aniline, N-methylaniline, diphenylamine and the like may be used. Of particular interest are the hydroxyalkyl amines, such as monoethanolamine, diethanolamine, N-ethyl-ethanolamine, monopropanolamine, dipropanolamine and the like. The mole ratio of amine to theoretical lactone based on aldehyde conversion is from 0.5:1 to 3:1 and preferably 1:1 to 2:1.

As indicated by infrared spectroscopy, the concentration of polyester in the ketene-aldehyde reaction mixture is between 50% and 80% by weight. During the reaction with the amine, infrared analysis indicates that the lactone portion of the intermediate reaction mixture is used up first, so that the remainder of the reaction is between the amine and the polyester. It is surprising to discover that the polyester is so reactive that the beta-hydroxyamides can be produced in yields ranging from 75% to almost 100% of theoretical. In fact, the overall reaction rate of the amide formation is believed to be greater than that found with the gamma-lactones and the amide product more stable.

The reaction between the amine and the product of reaction (1) is believed to be essentially as follows:

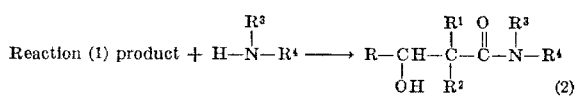

This reaction may be carried out at temperatures ranging from room temperature up to about 200° C. and preferably from about 40° C. to about 150° C.

The reaction products of this invention consist essentially of from about 40% to about 100%, frequently up to 96% by weight, of beta-hydroxyamide and up to about 60% by weight of a liquid or solid polyester obtained from the ketene-aldehyde reaction. Other reaction products involving side reactions with the polyester may also be present. As discussed previously, the amides of this invention are nonionic biodegradable detergents for use in both aqueous and non-aqueous fluids i.e., fuels, lubricating oils and other industrial fluids. For aqueous detergents, the R group of the aldehyde is preferably hydrogen or alkyl having between 4 and 20 carbon atoms; in hydrocarbon and other non-aqueous compositions, the R group may have as much as 50 carbon atoms. The amide can be separated from the reaction mixture for use alone. The final reaction mixtures also have utility as detergents, and they too are biodegradable.

To demonstrate the process of this invention, the following illustrative examples are provided.

EXAMPLE 1

Acetone vapors are refluxed onto a red hot Nichrome V wire. A stream of helium gas is used to dilute the product ketene gas. The evolved ketene is bubbled into 100 ml. of 0.8 molar solution of sodium hydroxide. It is found that 0.006 mole of ketene reacts in 15 minutes under these conditions or 0.024 mole of ketene produced per hour.

Into a suitable reactor are added 50 grams (0.272 mole) of dodecanal and 0.1 gram of zinc chloride. Holding the reactor at room temperature, ketene is added at the rate of 0.024 gram mole per hour with a carrier gas of 20 cc. per minute of helium. The reaction is carried on for about 9 hours. Infrared results show the presence of about 70% by volume of a polyester which has a distribution of molecular weight extending to over 4,000 (by gel permeation chromatography) and 30% beta-lactone. The total conversion of aldehyde is about 80%. The product is a yellow liquid.

To the resulting mixture is added diethanolamine in a ratio of 2 moles of diethanolamine to 1 mole of lactone (based on 80% conversion). The reaction temperature is held at about 50° C. After 4 hours at this temperature, infrared spectroscopy shows no lactone, about 60% polyester and 40% amide.

EXAMPLE 2

The procedure of Example 1 is repeated except that 60 grams of dodecanal and 0.2 gram of zinc chloride are used, and the reactor temperature is maintained between 5° and 10° C. Ketene is fed into this mixture at the rate of 0.024 gram mole per hour (with the 20 cc. per minute sweep of helium gas) until the reaction product turns to yellowish white liquid, containing a white solid dispersed in it.

Diethanolamine at a mole ratio of 2:1 of lactone is added, and the reaction mixture is heated to 100° C. The reaction is carried out for 24 hours under a nitrogen blanket. At this point, substantially all of the beta-lactone and over 90% of the polyester react. The yield of beta-hydroxytetradecanoic acid diethanolamide is about 95% of theory.

EXAMPLE 3

The procedure of Example 2 is repeated but instead of dodecanal, tetradecanal is used. The ketene is fed into the reactor containing the aldehyde for a period of 12 hours, the reaction vessel being maintained at room temperature. To the resulting liquid is added monoethanolamine at a mole ratio of 1.0 of amine to 1 of lactone (theoretical). The resulting reaction mixture contains beta-hydroxyhexadecanoic acid monoethanolamide, together with a small amount of residual polyester from the tetradecanal-ketene reaction.

EXAMPLE 4

The procedure of Example 2 is repeated except that the aldehyde is octanal and the ketene is methylketene. The intermediate reaction product, a liquid, is reacted with butylamine at a mole ratio of 1:1. The resulting reaction product consists of polyester formed in the methylketene-aldehyde reaction and alpha-methyl-beta-hydroxydecanoic acid butylamide.

The process and reaction products of this invention have been described in both broad and narrow terms. The scope thereof is deemed to include all obvious modifications thereof, except as limited in the following claims.

We claim:

1. A process for producing a beta-hydroxyamide comprising the steps of (1) reacting a ketene gas selected from the group consisting of ketene gas and methyl ketene gas and an aldehyde of the formula

wherein R is alkyl of from 4 to about 50 carbon atoms, in the presence of a Lewis acid, at a temperature of from about 5° C. to room temperature to produce a mixture of the corresponding lactone of the formula

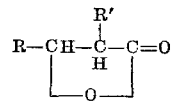

wherein R' is selected from the group consisting of hydrogen and methyl and a polyester derived from said reaction, and (2) reacting the mixed intermediate product of step (1) with an amine of the formula

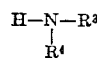

wherein $R^3$ and $R^4$ are individually selected from the group consisting of hydrogen and alkyl, aralkyl and hydroxyalkyl of from 1 to 30 carbon atoms to produce a reaction product consisting of said beta-hydroxyamide and polyester.

2. The process of claim 1 wherein at least one of $R^3$ and $R^4$ is hydroxyalkyl.

3. The process of claim 2 wherein the amine is selected from the group consisting of monoethanolamine and diethanolamine.

4. The process of claim 1 wherein step (1) is carried out in the presence of zinc chloride.

5. The process of claim 1 wherein a mixture of the ketene gas and helium gas is mixed with the aldehyde in step (1).

6. The process of claim 1 wherein the reaction temperature of step (1) is room temperature.

7. The reaction product obtained by the process of claim 1.

8. The reaction product of claim 7 wherein R is alkyl of from 4 to 20 carbon atoms.

9. The reaction product of claim 8 wherein the beta-hydroxyamide is selected from the group consisting of beta-hydroxytetradecanoic acid monoethanolamide, beta-hydroxytetradecanoic acid diethanolamide and beta-hydroxyhexadecanoic acid monoethanolamide.

References Cited
UNITED STATES PATENTS

| | | | |
|---|---|---|---|
| 2,375,005 | 5/1945 | Küng | 260—464 |
| 2,548,155 | 4/1951 | Gresham et al. | 260—561 |
| 2,623,070 | 12/1952 | Jansen | 260—561 |
| 2,548,156 | 4/1951 | Gresham et al. | 260—561 |
| 2,356,459 | 8/1944 | Küng | 260—344 |
| 2,968,629 | 1/1961 | Thompson | 260—389 |
| 3,395,162 | 7/1968 | Lamberti | 260—404 |

LEWIS GOTTS, Primary Examiner

D. G. RIVERS, Assistant Examiner

U.S. Cl. X.R.

252—548, 562 R; 260—484 A, 561 B